Patented May 14, 1929.

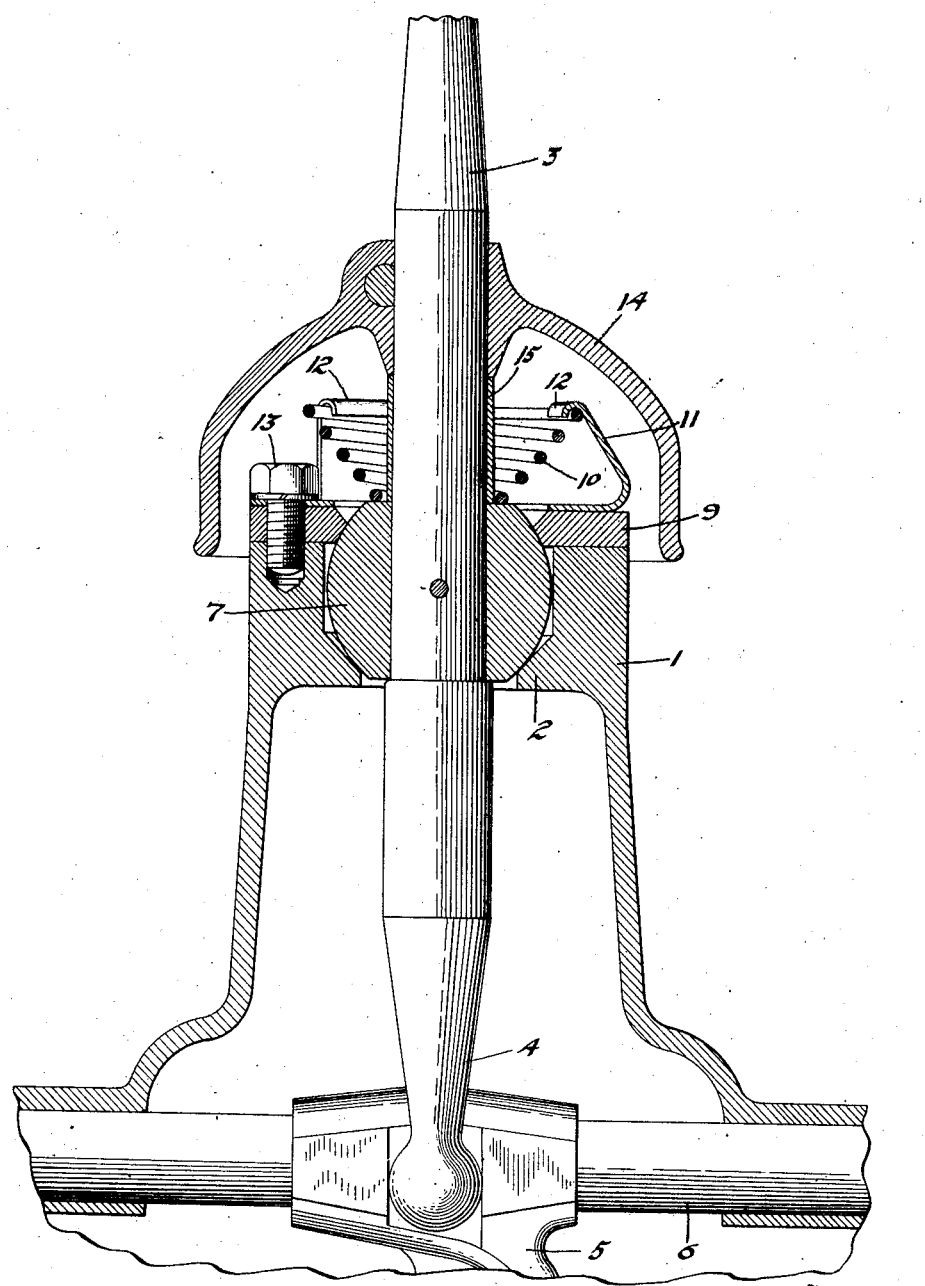

1,713,244

UNITED STATES PATENT OFFICE.

PERRY L. TENNEY, OF MUNCIE, INDIANA, ASSIGNOR TO GENERAL MOTORS CORPORATION, OF DETROIT, MICHIGAN, A CORPORATION OF DELAWARE.

GEAR-SHIFT-LEVER MOUNTING.

Application filed June 5, 1926. Serial No. 113,881.

This invention relates to a mounting for an automobile gear shift lever and the like, and has for its object the elimination of vibration and consequent noises and rattle of such levers, especially after they have been in use for a time and the parts become worn.

A further object of the invention is to provide a compact, simple type of mounting which will be economical to manufacture, possessing strength to withstand hard usage, automatic in operation, requiring no attention, and unlikely to get out of repair.

With the above primary and other incidental objects in view as will more fully appear in the specification, the invention consists of the features of construction, the parts and combinations thereof, and their mode of assembly as hereinafter described and set forth in the claims.

Referring to the drawing wherein is shown a vertical cross section of the preferred form of embodiment of the invention, the numeral 1 indicates the top portion of the transmission housing of an automobile, tractor, or like machinery, broken away so as to show only the essential features of the invention, the particular arrangement of gears not forming any part of the present invention. The top of the housing 1 has therein a central recess, with an interior tapered or beveled flange 2 at its bottom, which restricts the diameter of the opening and forms a pocket. A gear shift lever 3 extends through this opening and the lower or operating end 4 controls the shifting movement of the fork element 5 on a shaft 6, to throw the gears into and out of engagement with each other. The opposite end of the lever projects into close proximity to the operator's seat for manual control thereof.

At an intermediate point on the lever, a partly spherical element 7 is attached thereto in any suitable manner, in this instance by a pin 8, extending through and interlocking the spherical element 7 and shaft one to another. This spherical element 7 rests on the inclined surface of the flange 2, and rides thereon when the lever is shifted to and fro. The retaining plate 9 for the spherical element 7 is fastened to the top of the housing 1, and it also has a central opening surrounding the shift lever, and is provided with a beveled interior, resting against the surface of the spherical element 7 and in conjunction with the inclined flange 2 and spherical surface, forms a ball and socket joint for the shift lever and holds the lever in the pocket.

Ball and socket joints of this general type are not uncommon, but present a difficulty or disadvantage in that after they have been in use for a time the seating surfaces become worn. At such time, the lever vibrates and the loose joint sets up a disagreeable rattle or hum. To obviate such vibration and eliminate the rattling noise, a helical compression spring 10 has been provided to bear upon the flattened top surface of the spherical or ball enlargement 7 and maintain it in contact with the inclined surface of the flange 2. Inasmuch as the weight of the lever will have a natural tendency to seat the ball upon the flange 2, the spring need not be one of high tension or extremely heavy, but a light spring of sufficient strength to resist the vibration will suffice. A seat for the upper end of the spring 10 is provided in the form of a retainer 11, which may be of any suitable construction, in this instance being formed of a single piece of sheet metal stamped or spun to the shape shown, with an upstanding and inturned side, provided at spaced intervals with overhanging curved lips 12 in which the final convolution of the spring 10 is held. The lower flat horizontal portion of the retainer 11 rests on the plate 9. A series of screw threaded studs 13, at the outer edge of the housing, extend through and anchor the retainer 11 and plate 9 to the top of the housing.

The top of the housing, in the case of an automobile, extends through the floor-boards and into the driver's compartment. In order to protect the parts from injury and afford a neater appearance for this top, the inverted cup or dome 14 enclosing the top and anchored parts is mounted on the gear shift lever 3. Any suitable mounting for the dome 14 may be employed; for instance, the top may be split and then drawn or clamped upon the lever by means of a nut and bolt. To insure the proper spacing of the dome 14 from the housing parts, the spacer sleeve 15 surrounds the shift lever between the top of the spherical or ball enlargement 7 and the dome 14.

Thus it will be seen that the objectionable disadvantages of a ball and socket pivoted shift lever are effectually overcome by automatically compensating for wear of the parts, and the extreme simplicity and lightness of the parts enables production at a minimum cost.

While the invention has been described in more or less detail, there is no intention to limit it to the exact form shown, but obvious modifications may be employed without departing from the spirit or scope of the invention as set forth in the appended claims.

Having thus described my invention, I claim:

1. The combination with a transmission housing having a socket therein, a gear shift lever extending into the housing and pivoted in said socket, of a resistance member to maintain the lever in close engagement with the socket, including a spring bearing on the gear shift lever, a casing on the transmission housing having an upstanding flange and an inturned lip on said flange to afford a seat for the spring.

2. The combination with a transmission housing having a pocket therein, a gear shift lever extending into the housing and having a spherical enlargement seating in the pocket, of a plate on the top of the transmission housing to maintain the lever in the pocket, a compression spring exerting downward force on the spherical enlargement to insure its close contact in the pocket, and a retainer for the spring on the transmission housing.

3. The combination with a transmission housing having a counterbored opening in its top, of a plate attached to the top of the housing and also having a counterbored opening, oppositely disposed to the counterbore in the top of the housing and forming therewith a socket, a shift lever extending through said openings into the housing, a spherical enlargement on the lever seating within the socket, a compression spring bearing on top of the spherical surface and exerting downward pressure thereon, and a retainer for said spring mounted on the transmission housing.

4. The combination with a transmission housing having a socket therein and a gear shift lever having a ball adapted to seat in said socket, of a spring bearing on the top of said ball, a retainer for the spring fixedly mounted on top of the housing, a protective cap overlying and enclosing said parts on top of the housing, and carried by said shift lever, and a spacer sleeve on the lever between the ball and said cap to maintain the cap in spaced relation with the casing.

In testimony whereof I affix my signature.

PERRY L. TENNEY.